(12) United States Patent
Collings, III (10) Patent No.: US 7,216,145 B2
(45) Date of Patent: May 8, 2007

(54) EVENT NOTIFICATION SYSTEM (75) Inventor: John K. Collings, III, Mableton, GA (US)

(73) Assignee: Mission Communications, LLC, Norcross, GA (US)

( * ) Notice: Subject to any disclaimer, the term of this patent is extended or adjusted under 35 U.S.C. 154(b) by 936 days.

(21) Appl. No.: 09/858,403

(22) Filed: May 16, 2001

(65) Prior Publication Data

US 2002/0002633 A1   Jan. 3, 2002

Related U.S. Application Data (60) Provisional application No. 60/213,372, filed on Jun. 23, 2000.

(51) Int. Cl.
*G06F 15/16* (2006.01)

(52) U.S. Cl. .................. 709/206; 709/220; 455/404

(58) Field of Classification Search ........ 709/200–203, 709/223, 229, 204, 206, 207, 213, 215, 208, 709/224, 220; 713/202, 340; 379/201, 37; 719/318, 313; 340/825, 7, 573; 715/717; 718/103; 370/352, 229; 702/188; 712/222; 455/404, 414
See application file for complete search history.

(56) References Cited

U.S. PATENT DOCUMENTS

| | | | | |
|---|---|---|---|---|
| 4,774,658 A | * | 9/1988 | Lewin | 340/825.49 |
| 4,783,654 A | * | 11/1988 | Ichikawa | 340/7.28 |
| 5,197,138 A | * | 3/1993 | Hobbs et al. | 712/222 |
| 5,266,944 A | * | 11/1993 | Carroll et al. | 340/825.36 |
| 5,319,355 A | * | 6/1994 | Russek | 340/573.1 |
| 5,398,277 A | * | 3/1995 | Martin et al. | 379/39 |
| 5,428,766 A | * | 6/1995 | Seaman | 709/215 |
| 5,475,377 A | * | 12/1995 | Lee | 340/5.9 |
| 5,499,364 A | * | 3/1996 | Klein et al. | 709/202 |
| 5,504,476 A | * | 4/1996 | Marrs et al. | 340/7.48 |
| 5,566,339 A | * | 10/1996 | Perholtz et al. | 713/340 |
| 5,619,697 A | * | 4/1997 | Nishida | 719/313 |
| 5,646,982 A | * | 7/1997 | Hogan et al. | 379/88.22 |
| 5,696,500 A | * | 12/1997 | Diem | 340/7.55 |
| 5,737,240 A | * | 4/1998 | Ellsworth et al. | 709/214 |
| 5,805,569 A | * | 9/1998 | Lindqvist et al. | 370/229 |
| 5,867,688 A | * | 2/1999 | Simmon et al. | 709/208 |
| 5,889,988 A | * | 3/1999 | Held | 718/103 |
| 5,935,251 A | * | 8/1999 | Moore | 713/202 |

(Continued)

OTHER PUBLICATIONS

Conventional Vs. Neuro-Conventional Segmentation Techniques.— Blumenstein, Verma; eassun.eas.gu.edu.au/publications/icips98.ps.*

(Continued)

*Primary Examiner*—Thong Vu
(74) *Attorney, Agent, or Firm*—Bryan W. Bockhop; Bockhop & Associates, LLC (57) ABSTRACT

In a method of transmitting an event notification, a first data packet that includes a first event code is transmitted to a first individual via a not-automatically receipt confirmed communication. Upon receiving a response communication from the first individual, the first individual is requested to respond with the first event code. If the first individual responds by transmitting the first event code, then the first event is identified from the first event code. Instructions relating to the first event are transmitted to the first individual. Status of notifications are displayed on a map which is displayed on a computer screen.

25 Claims, 8 Drawing Sheets

U.S. PATENT DOCUMENTS

| | | | | |
|---|---|---|---|---|
| 5,960,337 | A * | 9/1999 | Brewster et al. | 455/404.2 |
| 5,999,978 | A * | 12/1999 | Angal et al. | 709/229 |
| 6,073,163 | A * | 6/2000 | Clark et al. | 709/203 |
| 6,148,403 | A * | 11/2000 | Haneda et al. | 726/19 |
| 6,266,525 | B1 * | 7/2001 | Peterson | 455/410 |
| 6,388,687 | B1 * | 5/2002 | Brackett et al. | 715/810 |
| 6,425,009 | B1 * | 7/2002 | Parrish et al. | 709/224 |
| 6,434,150 | B1 * | 8/2002 | Bog et al. | 370/395.1 |
| 6,434,343 | B1 * | 8/2002 | Kobayashi et al. | 399/8 |
| 6,442,241 | B1 * | 8/2002 | Tsumpes | 379/45 |
| 6,459,782 | B1 * | 10/2002 | Bedrosian et al. | 379/201.08 |
| 6,480,883 | B1 * | 11/2002 | Tsutsumitake | 709/203 |
| 6,505,244 | B1 * | 1/2003 | Natarajan et al. | 709/223 |
| 6,553,100 | B1 * | 4/2003 | Chen et al. | 379/37 |
| 6,553,336 | B1 * | 4/2003 | Johnson et al. | 702/188 |
| 6,571,285 | B1 * | 5/2003 | Groath et al. | 709/223 |
| 6,622,016 | B1 * | 9/2003 | Sladek et al. | 455/414.1 |
| 6,633,224 | B1 * | 10/2003 | Hishida et al. | 340/7.21 |
| 6,647,432 | B1 * | 11/2003 | Ahmed et al. | 719/318 |
| 6,662,206 | B1 * | 12/2003 | Banavar et al. | 709/201 |
| 6,731,625 | B1 * | 5/2004 | Eastep et al. | 370/352 |
| 6,760,849 | B1 * | 7/2004 | Parrish et al. | 713/310 |
| 6,784,899 | B1 * | 8/2004 | Barrus et al. | 715/717 |
| 6,816,878 | B1 * | 11/2004 | Zimmers et al. | 709/200 |
| 6,817,019 | B1 * | 11/2004 | Wang et al. | 719/318 |
| 6,842,774 | B1 * | 1/2005 | Piccioni | 709/207 |
| 6,845,388 | B1 * | 1/2005 | Philyaw | 709/204 |
| 6,856,236 | B2 * | 2/2005 | Christensen et al. | 340/3.5 |
| 6,893,396 | B2 * | 5/2005 | Schulze et al. | 600/300 |
| 6,915,332 | B1 * | 7/2005 | Zdepski | 709/206 |
| 6,922,722 | B1 * | 7/2005 | Mann et al. | 709/220 |
| 6,922,724 | B1 * | 7/2005 | Freeman et al. | 709/223 |
| 6,940,405 | B2 * | 9/2005 | Script et al. | 340/545.1 |
| 2001/0033298 | A1 * | 10/2001 | Slotznick | 345/758 |
| 2002/0010750 | A1 * | 1/2002 | Baretzki | 709/208 |
| 2002/0021242 | A1 * | 2/2002 | Flick | 342/357.07 |
| 2002/0112008 | A1 * | 8/2002 | Christenson et al. | 709/206 |
| 2004/0140891 | A1 * | 7/2004 | Capowski et al. | 340/506 |

OTHER PUBLICATIONS

Quantitative Evaluation of Coreference Algorithms in an..—Gaizauskas, Humphreys (1996); ftp.dcs.shef.ac.uk/home/robertg/daarc96.ps.*

Role of Verbs in Document Analysis—Klavans, Kan (1998); www.cs.columbia.edu/~min/papers/verbs.ps.gz.*

Continual Queries for Internet Scale Event-Driven Information..—Liu (1999) www.cse.ogi.edu/~lingliu/Papers/final-tkde99.ps.*

Generic Support for Distributed Applications—Bacon, Moody, Bates, Hayton.. (2000) www.cl.cam.ac.uk/Research/SRG/opera/publications/Papers/computer-march2000.pdf.*

A scalable and explicit event delivery mechanism for UNIX—Banga, Mogul, Druschel (1999) www.cs.rice.edu/~druschel/usenix99event.ps.gz.*

The Internet Multimedia Conferencing Architecture—Handley, Crowcroft, Bormann (1996)□□ftp.isi.edu/confctrl/docs/draft-ietf-mmusic-confarch-00.ps.Z.*

System Support for Mobile Multimedia Applications—Jon Inouye Shanwei (1997) □□www-internal.cse.ogi-edu/~jinouye/.*

SHARE: A Methodology and Environment for Collaborative..—Toye, Cutkosky.. (1993) □□cdr.stanford.edu/pub/CDR/Publications/Reports/Share.ps.*

* cited by examiner

EVENT NOTIFICATION SYSTEM

CROSS REFERENCE TO A PROVISIONAL APPLICATION

This patent application claims priority on Provisional Application Ser. No. 60/213,372, filed on Jun. 23, 2000, the entirety of which is hereby incorporated by reference.

BACKGROUND OF THE INVENTION

1. Field of the Invention

The present invention relates to communications systems and, more specifically, to systems that transmit notifications using non-automatically receipt confirmed technology.

2. Description of the Prior Art

Existing event notification systems alert an operator at a central office to the occurrence of events. Such events could, for example, take the form of alarms at remote facilities. The operator, once alerted to the event, evaluates the event and, if indicated, dispatches a technician to the site of the event. For example, in a water utility system, an event might include a high wet well alarm at a pumping station. The notification system alerts a central utility office of the alarm. An operator responds to the alarm by directing a technician via telephone to the pumping station, along with providing information necessary for the technician to investigate the alarm.

An autodialer notification system involves a device disposed at a remote facility that is connected to a dedicated telephone line. If an event is sensed, the autodialer device typically dials the telephone number of the central office and reports the event to an operator. An autodialer system has the disadvantage of requiring the user to bear the expense of a dedicated telephone line. A dedicated radio notification system works like an autodialer notification system, except that it uses a dedicated radio system to perform the communication function. Typical dedicated radio systems also tend to be expensive. Furthermore, such systems do not include an inherent mechanism for verifying that the technician has accepted responsibility for an event or that the technician has arrived at the site of the event.

Graphical event reporting systems typically include a display, such as a computer screen or a board with embedded lights, that presents a map or other image depicting potential locations of events (which are fixed locations) and an indication of the occurrence of events as they occur. Such systems have the disadvantage of not being able to display simultaneously the location of mobile assets (e.g., technicians) that can respond to the events.

One application of an event reporting system reports rainfall. Such a system uses a "tipping bucket" that measures rainfall and that is coupled to a prior art reporting system to notify a central office of heavy rainfall episodes. Given that rain frequently falls over a wide geographic area having multiple rainfall reporting systems dispersed throughout the area, existing systems may cause multiple alarms to be sent to the central office to report a single episode of heavy rain.

Therefore, there is a need for an event notification system that automatically verifies a response to an event, that is compatible with existing event notification systems, that displays the location of both events and mobile assets assigned to respond to events, and that is capable of accepting a single response for multiple linked alarms.

SUMMARY OF THE INVENTION

The disadvantages of the prior art are overcome by the present invention which, in one aspect, is a method of transmitting an event notification in which a first data packet that includes a first event code is transmitted to a first individual via a not-automatically receipt confirmed communication. The first event code corresponds to a first event. Upon receiving a response communication from the first individual, the first individual is requested to respond with the first event code. If the first individual responds by transmitting the first event code, then the first event is identified from the first event code. Instructions relating to the first event are transmitted to the first individual.

In another aspect, the invention is a method of transmitting an event notification in which an event indication, indicating an event condition, is received from a remote station. At least one individual is notified of the event upon expiration of a preselected period.

In another aspect, the invention is a method of transmitting an event notification in which a notification of an event is automatically transmitted from a central event notification center to at least one individual. An indication of acceptance of responsibility for the event is received from the individual at the central event notification center. Upon completion of the receiving step, a central database is updated to indicate that the event has been responded to.

In another aspect, the invention is a method of displaying status of notifications in which a map is displayed on a computer screen and at least one first icon, corresponding to a location of a stationary asset that is subject to the occurrence of events, is displayed on the map. The icon is altered to signify the occurrence of a first event if the first event occurs at the stationary asset. An indication of a current location of a mobile asset assigned to respond to the event is received. At least one second icon, corresponding to a current location of the mobile asset, is displayed on the map In yet another aspect, the invention is method of delivering event notification data to a proprietary network used by a local facility in which event notification data is received from a local reporting device. The event notification is received at a central notification processing center of a multi-user notification network. The event notification data is converted from a first data format, characteristic of the multi-user notification network, into a second data format, characteristic of a proprietary network. The event notification data, in the second data format, is transmitted to a local facility.

In yet another aspect, the invention is a method of monitoring rainfall in which rainfall is sensed with a rainfall sensor at a selected location. Rainfall data indicating an accumulated rainfall amount, determined as a result of the sensing step, is periodically transmitted to a central processing center using a not-automatically receipt confirmed communication protocol device and the rainfall data is provided to a selected local facility.

In yet another aspect, the invention is a device for accepting a response to a notification from an individual at a selected location that includes a personal identification apparatus disposed at the selected location. The personal identification apparatus is capable of identifying an individual and is capable of verifying that the individual is at the selected location. A wireless communication apparatus, responsive to the personal identification apparatus, transmits to a central notification processing center an indication that the individual is at the selected location.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a,""an,"and "the" includes plural reference, the meaning of "in" includes "in" and "on." Also, as used herein, "global computer network" includes the Internet. "Not-automatically receipt confirmed" communications are communications in which the technology employed does not automatically provide the sender with a confirmation of receipt by the receiver of a communication.

Figure 1:
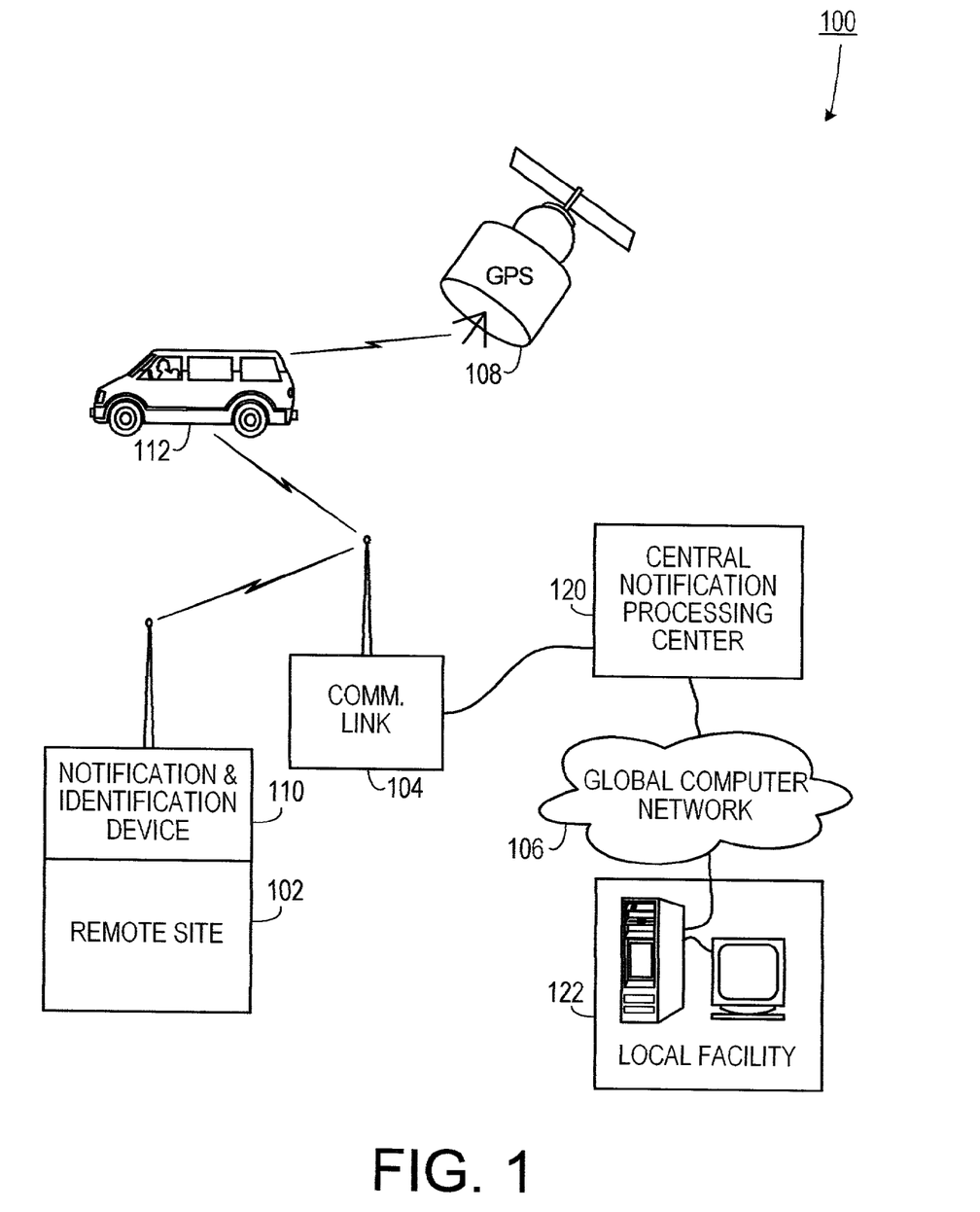
FIG. 1 is a schematic diagram illustrating one aspect of the invention.

As shown in FIG. 1, in one embodiment of the invention 100, a plurality of notification and identification devices 110 are disposed at a plurality of remote sites 102. Examples of remote sites include, but are not limited to: pumping stations operated by water utilities, communication switching stations, remote power distribution stations, and rainfall measuring points. The notification and identification devices 110 each communicate with a wireless communications link 104. Many different types of communications link systems could be employed with the invention without departing from its scope, a few illustrative examples of which include: the Cell Digital Packet Data (CDPD) system; the Wireless Data Network, available from Bell South; and the National 2-way paging system available from Page Net.

Figure 2:
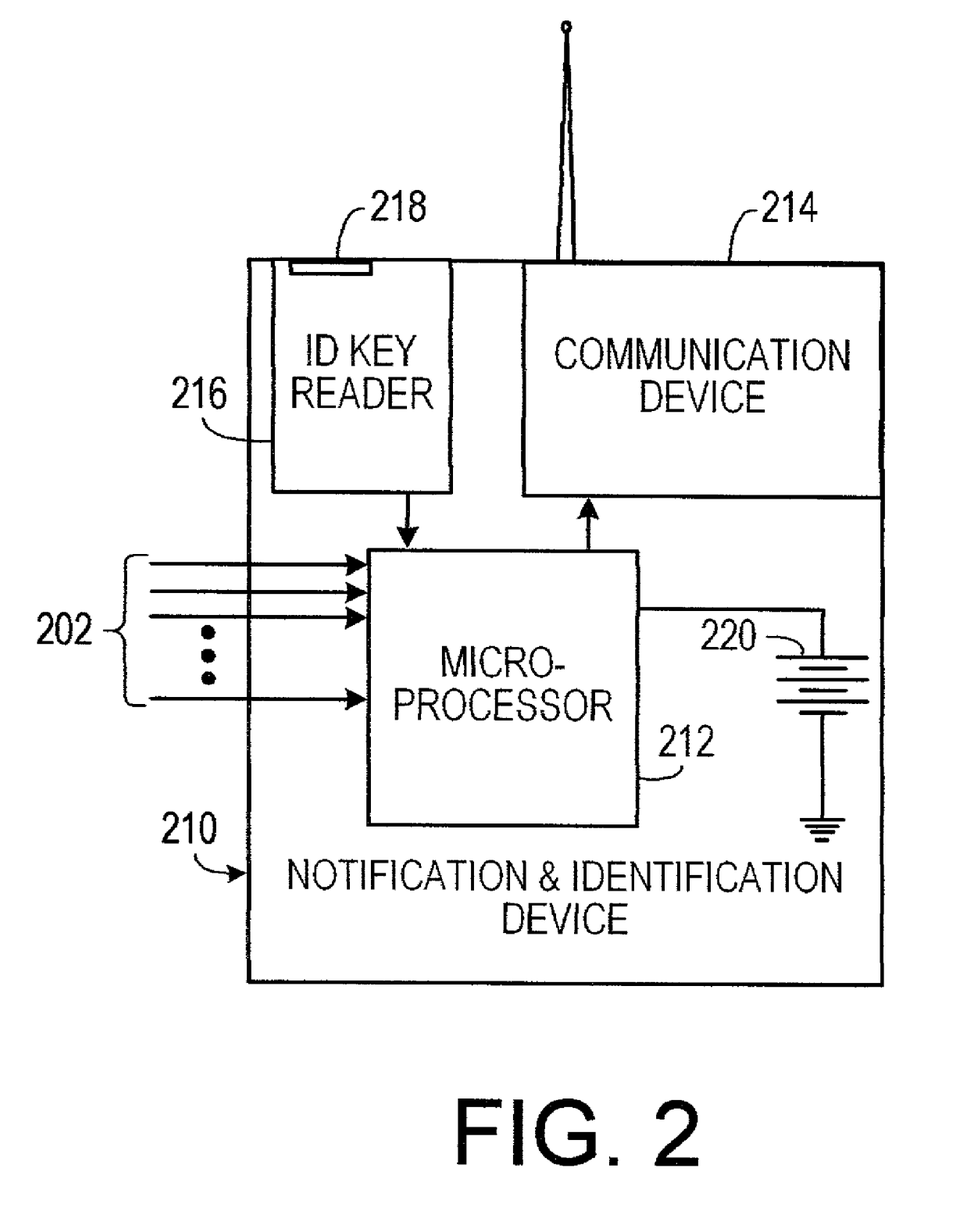
FIG. 2 is a schematic diagram of a transmitting device according to one aspect of the invention.

As shown in FIG. 2, a typical notification and identification device 210 is powered by a voltage source 220, such as a power supply backed up by a battery, and includes an electronic controller 212, such as a microprocessor, that is responsive to one or more event signals 202 (i.e., alarm signals) received from the local site. The event signals are received from devices having automatic alarms and automatic measuring capability (e.g., rainfall sensors such as a tipping bucket-type sensors). The controller 212 communicates with a wireless communication device 214 so that when an event is sensed at the local site, the controller 212 causes a signal indicative of the type and location of the event to be sent to the communications link. A personal identification apparatus 216 is in communication with the controller 212 and is capable identifying and individual. In one embodiment, the personal identification apparatus 216 comprises an identification service key reader 218, such as I Button Technology, available from Dallas Semiconductor Corporation. With an identification key reader 218, each individual who would respond to an event is issued an electronic identification key that generates a unique signal. To indicate arrival at a location of an event, the individual passes the identification key close to the key reader 218. The key reader 218 senses the unique signal generated by identification key and transmits a corresponding electrical signal to the controller 212. Other methods of personal identification within the scope of the invention include: bar code scanning (employing a bar code reader disposed at the identification device 210 and a bar coded tag issued to the individual), magnetic stripe reading (employing a magnetic stripe reader and a card with a magnetic stripe), a biometric data reader (such as a finger print reader), or any of the many other technologies for identifying personnel at a specific location.

Returning to FIG. 1, the communications link 104 communicates with a central notification processing center 120, which is also in communication with a plurality of local facilities 122 via the global computer network 106 (e.g., the Internet), or other type of wide area network (e.g., a telephone system). Each local facility is typically owned by a subscribing organization and the central notification processing center 120 could be a facility having area-wide (including nation-wide or even world-wide) responsibility for a plurality of notification and identification devices 110, groups of which are owned by several different subscribing organizations that are dispersed over the entire area of responsibility.

The central notification processing center 120 is also in communication, via the communications link 104, with a plurality of employees 112 of the subscribing organizations, or other responsible personnel. Such employees 112 would be assigned by the subscribing organizations to respond to the various events. For example, if one of the subscribing organizations was a water utility, the organization could assign electrical technicians to respond to electrical system alarms, could assign plumbers to respond to piping system alarms and could assign security personnel to respond to intruder alarms. The assigned employees 112 could also be in communication with a locating system 108 to provide location data to the central notification processing center 120.

Figure 3A:
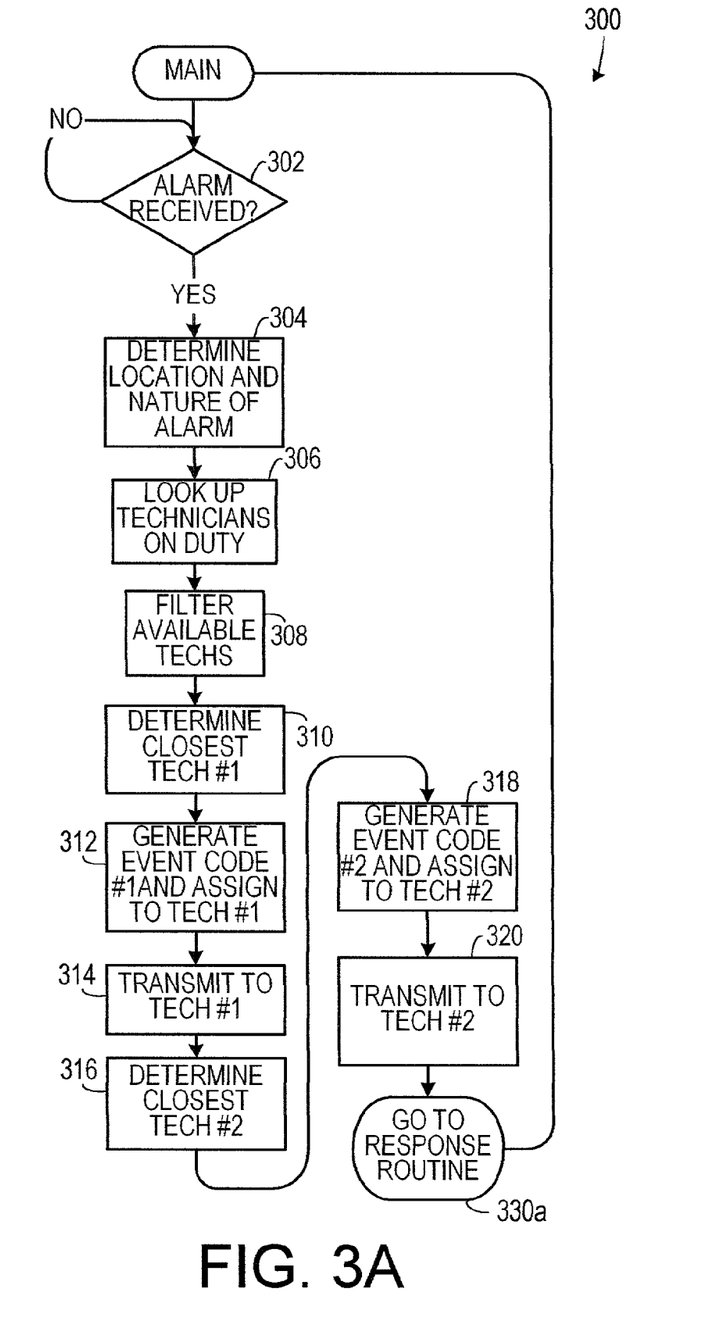
FIG. 3A is a flowchart illustrating one embodiment of a method according to the invention.

A shown in FIG. 3A, the system operates in a wait loop 302 until an alarm, or other event notification, is received from a remote site. Upon receipt of an event notification, the system determines the location and nature of the event 304. Typically, the notification device transmits a code to the central notification processing center that identifies both the location and the nature of the event. Thus, to perform the determining step 304, the central notification processing center indexes a look-up table with the identifying code.

The system activates a scheduler routine, which accesses a data base 306 to determine the personnel currently on duty who may respond to the event. The available personnel may be further filtered 308 based on other criteria, such as who is already assigned to other tasks, who is best qualified to respond, etc. The selection criteria may include: who of the plurality of individuals is currently on duty, who of the plurality of individuals is closest to a location of the event, who of the plurality of individuals is currently not assigned to another event, and who of the plurality of individuals is most capable of responding to the event. For example, if a pumping station were to report an ac power failure, then the system would notify a technician from power utility. If the pumping station were to report a high wet well, then the system would notify a custodian with a pump. If the pumping station were to report a pump not starting, then the system may notify a pump technician. If the pumping station were to report a intrusion, then the system would notify a security office or the police.

The system may also determine who of the qualified candidates is the closest to the event 310 and generates an event code that is assigned to the closest potential responder 312. The event code is then transmitted to the responder 314 via a not-automatically receipt confirmed transmission medium. Examples of such media include pagers, wireless telephones and even radio broadcasts. The responder is instructed to call the central notification processing center, enter the event code and follow a procedure to indicate acceptance of responsibility for the first event, such as depressing a preselected button on a telephone handset. The responder may also be given a set of instructions as to how to respond to the event and directions to the location of the event. The system may also execute a responder backup routine, in which a secondary responder is chosen 316 from the list of available and qualified responders, a second event code is generated and assigned to the secondary responder 318. The second event code is transmitted to the secondary responder 320 and the system exits 330a to a receive response routine.

Figure 3B:
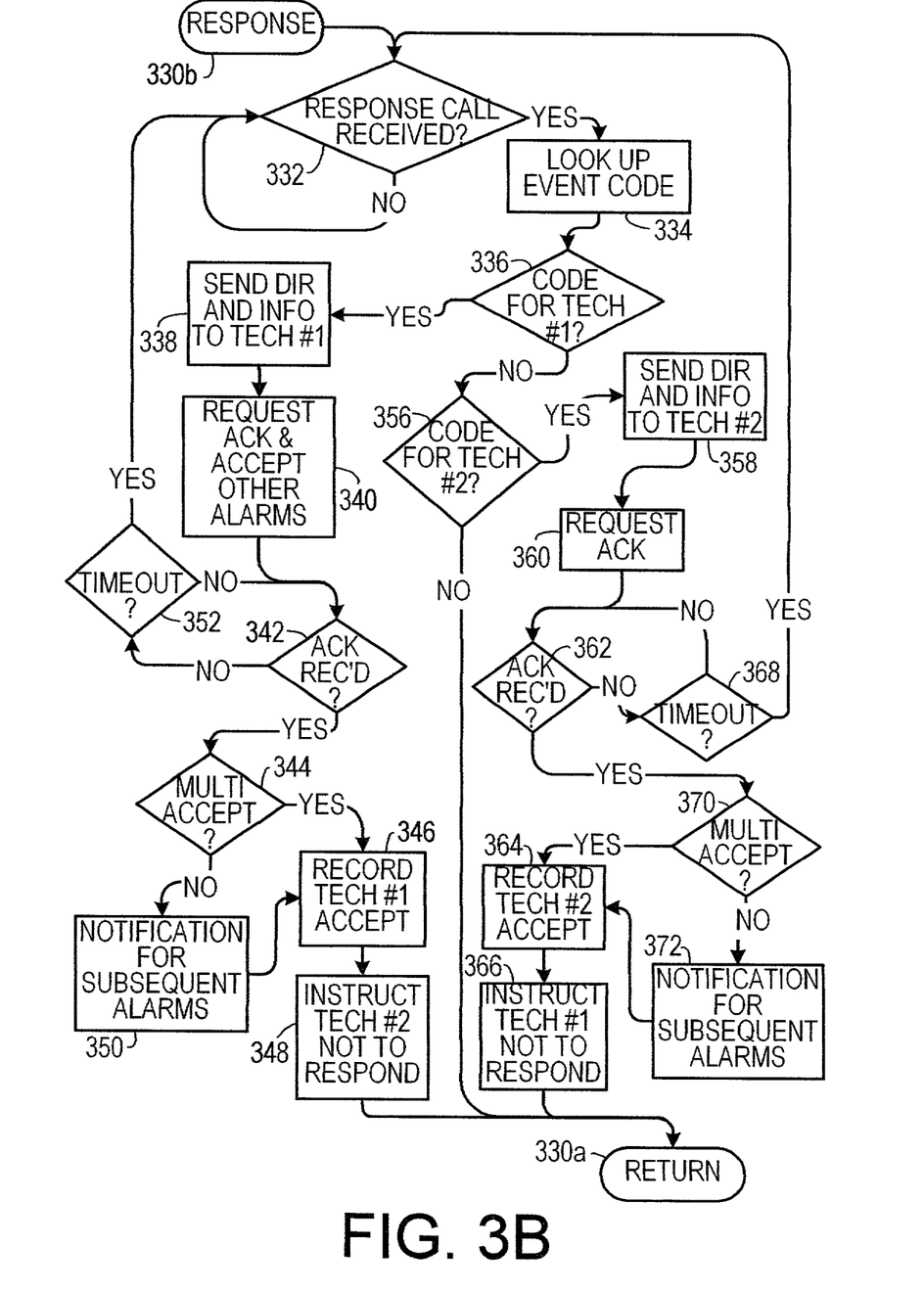
FIG. 3B is a flowchart illustrating a response routine employed with the flowchart of FIG. 3A.

After entry 330b to the receive response routine, as shown in FIG. 3B, the system awaits a response 332 from the individuals assigned to respond to the event. As part of the response process, the system requires the person responding to enter the event code. If preselected amount of time expires prior to receipt of the acknowledgment 352, then control returns to the await response loop 332. Once a response is received, the system accesses 334 a look-up table indexed on the event code included in the response. The system then determines 336 if the event code corresponds to the event code transmitted to the first technician. If so, the system transmits information 338, such as directions and an identification of the event, etc., to the first technician. The caller could also be identified by a caller identification packet received from the telephone system. The system then requests 340 that the first technician accept responsibility for the event. If an acknowledgment is received 342, indicating that the first technician accepts responsibility for the event, the system requests that the technician accept responsibility for all related events 344 (if any), such as related pending events or related subsequent events. If the technician refuses to accept responsibility for related events, the system sends notifications 350 for subsequent and pending related alarms and records the acceptance 346 of the first event by the first technician. If the first technician accepts subsequent events, then the system records the acceptance 346 of the event and instructs 348 the second technician not to respond to the event. At this point, control returns 330a to the main routine.

While one way of receiving acknowledgment for an event is through the call-in procedure described above, other ways of acknowledging events may also be employed. For example, returning to FIG. 1, if a response vehicle 112 corresponding to the assigned technician includes a locator employing GPS 108 and if transmissions from the response vehicle 112 indicate that the response vehicle 112 is within a predetermined distance from the location of the event for a predetermined amount of time, then the central notification processing center 120 may be programmed to assume that the assigned technician has responded to the event. The personal locator apparatus may be programmed to enter an inactive mode once the location of the individual is within the preselected distance from the event, thereby reducing wear on the battery of the service vehicle 112. Similarly, referring to FIG. 2, if the assigned technician activates the personal key reader 218 at the location of the event, then the system may be programmed to assume that the assigned technician has responded. Automatic response acknowledgments, as described above, may be useful when the technician has no other means of contacting the central notification processing center 120, such as when the technician is notified of an event by a pager, and in cases where technicians forget to call in to respond to event notifications.

Returning to FIG. 3, if the result of decision 336 is that the event code does not correspond to the first technician, then the system determines if the code corresponds to the second technician 356. If not, then the event code is either spurious or garbled and control returns 330a to the main routine. It the event code does correspond to the second technician then the system transmits information 358, such as directions and an identification of the event, etc., to the second technician. The system then requests 360 that the first technician accept responsibility for the event. If an acknowledgment is received 362, indicating that the second technician accepts responsibility for the event, the system requests that the technician accept responsibility for all related events 370 (if any). If the second technician refuses to accept responsibility for related events, the system sends notifications 372 for subsequent related alarms and records the acceptance 364 of the event by the second technician. If the technician accepts subsequent events, then the system records the acceptance 364 of the event and instructs 366 the first technician not to respond to the event and control returns 330a to the main routine.

In an alternative embodiment, the system could send a single event code to a plurality of potential responders and then identify the person accepting responsibility for the event either at the time the person calls into the central facility, or at the time the person actually arrives at the site of the event. In this embodiment, upon receipt of a first response, the system may send out subsequent notifications to the potential responders indicating that a response to the event has been received. The system would also record the first response at the central event notification center.

By recording the events and acceptance of responsibility therefore, the system is able to generate useful management reports. Such reports could include reports relating to response time of the technicians, average workload and the types of events that occur.

The system may also programmed so as to able to report operating parameters to the responder. For example, in a case where the notification device were monitoring a pumping station, the notification device could transmit a recent pump run time history upon receipt of a high wet well alarm. The central notification server could then forward this information to the responding technician, who could use the information to determine whether the cause of the alarm was a faulty pump or some other cause.

Figure 3C:
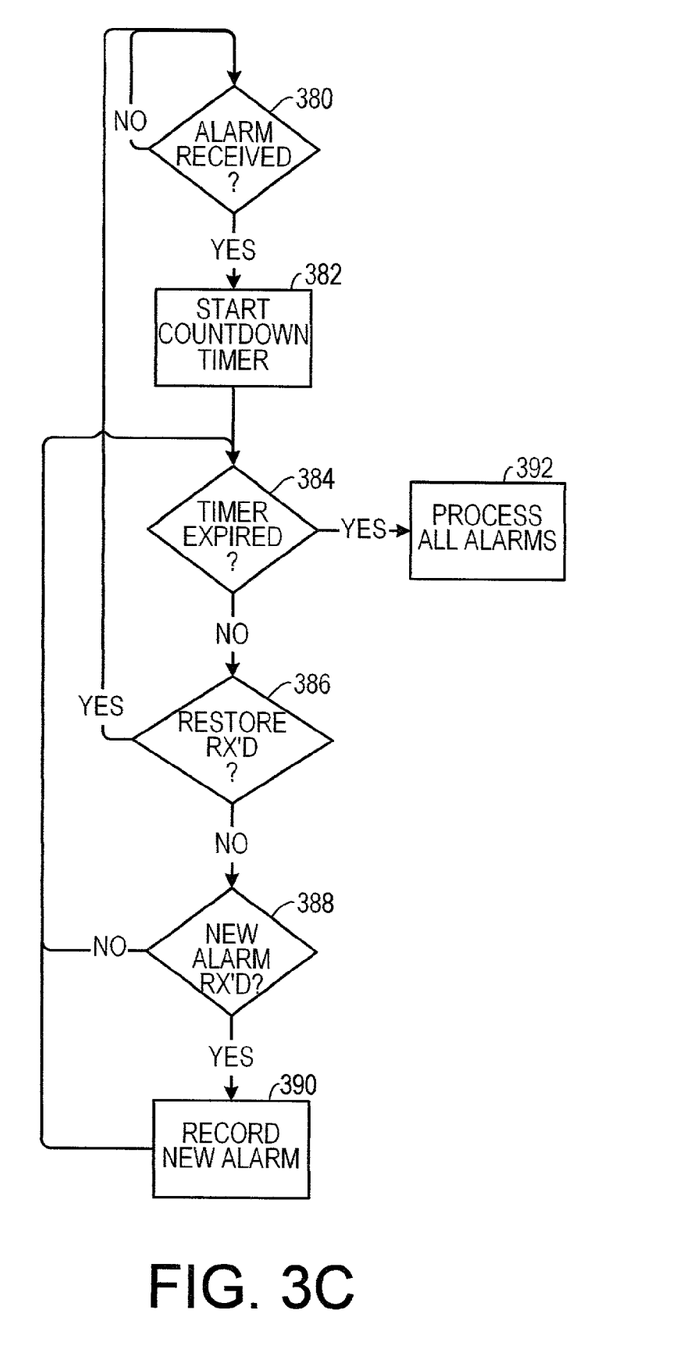
FIG. 3C is a flowchart illustrating a response illustrating a routine for handling multiple alarms.

As shown in FIG. 3C, a routine used to group several related alarms (or other reportable events) and to ignore spurious alarms may be employed to prevent a responder from receiving many different related alarms or spurious alarms. The routine starts with waiting for an alarm to be received 380. Upon receipt of an alarm, the system will start a timer 382 that counts a preselected period of time. The preselected period should correspond to the greater of the expected amount of time from completion of the receiving step 380 until a restore signal would be transmitted from the station transmitting the alarm or the expected amount of time from completion of the receiving step 380 until all related alarms were received. The system checks to see if the preselected period has expired 384 and, if not, it will check to see if a restore indication (received from the alarm reporting device) has been received 386. Such a restore indication would indicate that the alarm condition has gone away. If a restore has been received, the system is reset and control passes to decision 380. Otherwise, the system checks to see if a new related alarm has been received 388. Related alarms are alarms that occur as a result of a common occurrence. For example, an area-wide power failure could cause several geographically close pumps to fail simultaneously. Similarly, a power failure at a pumping station could first trigger an AC power failure alarm. The loss of AC power could cause a high wet well, which would trigger a high wet well alarm. A high wet well could trigger a pump failure alarm and then a pressure leak failure alarm. These cascading alarms would typically occur within the predetermined period from the AC failure alarm. Each time a new related alarm is received during the predetermined period, the system records the new alarm 390 and checks if the predetermine period has expired yet 384. Once it has expired, the system may process all alarms 392 by grouping the related alarms and by sending out a group notification of the related alarms.

As will be readily appreciated by those of skill in the art of software design, the above example is but one of many ways of embodying the invention. Thus, the scope of the invention is not to be limited by the specific method shown in FIGS. 3A–C.

The system could also include a routine that automatically waits for a responder when calling the responder to report an event. For example, the central notification center could call a responder and state "This is XYZ Corp. calling for John Doe, if John Doe is available, please press 1, if John Doe is not available, please press 9, if you would like me to wait while John Doe becomes available, please press 5." If the person at the receiving end presses 5, indicating that the responder is expected to pick up the telephone shortly, the system will then play a wait message, such as "I am waiting for John Doe. When John Doe is available, please press 1."

Figure 4:
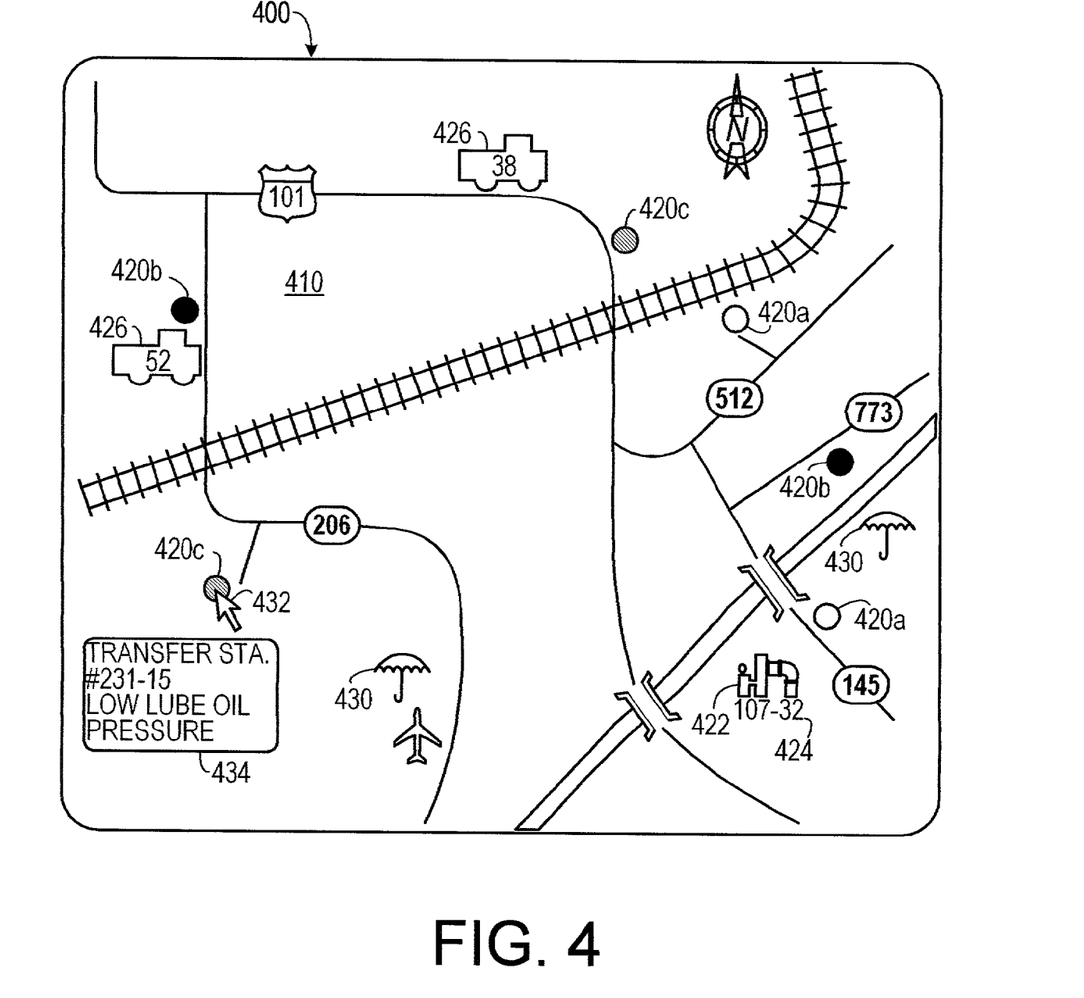
FIG. 4 is one exemplary output screen accessible by a user of the invention.

As shown in FIG. 4, the system presents a display 400, via the global computer network, to the local facility (122 in FIG. 1). The display includes a map 410 that shows the location of fixed assets where event notification devices are disposed and the location of mobile assets capable of responding to the events. The fixed assets may be simply depicted as dots 420a–c on the map 410, or as graphical icons representing the type of fixed asset. For example, icon 422 represents a pumping station, whereas icon 430 represents a rain gauge. Identifying text 424 may accompany the graphics icons 422 or the dots 420a–c, or both. A preselected color or texture scheme can be associated with the representations of the fixed assets to convey information relating to events. For example, dots 420a could be colored green to indicate no reported events, dots 420b could be colored red to indicate alarms, and dots 420c could be colored yellow to indicate warning-type events. Flashing dots and non-flashing dots could also be displayed to indicate relative urgency of an event. Furthermore, a pop-up providing additional information 434 about an event may be displayed upon pointing a cursor 432 at the graphical display of the fixed asset.

The map 410 also shows the current location of mobile assets that may be available to respond to events. The mobile assets, such as service trucks, may be represented with graphical icons 426 that resemble the type of mobile asset. Information specifically identifying the mobile asset (e.g., a truck number) may also be included in the icon. The location of the mobile asset may be determined in one of several ways. For example, the mobile asset may include an auto vehicle locating device or other type of personal locating device, such as a Global Positioning Satellite receiver, that periodically transmits its position to the central notification processing center. The personal locating device could also include a cell phone locator, a net-based locator device, or one of many other personal locating devices known to the art. The current location could also be determined from reports radioed in by the technician driving the service truck 426. The system could also provide a mechanism for switching back and forth between a map showing fixed assets and a corresponding map showing mobile assets.

Once the system verifies that the technician has arrived at the location of the event, the system is informed of the arrival and may activate a service mode that causes a preselected set of subsequent events occurring at the location of the event to be ignored. This may be useful, for example, when a technician must turn off power to a system in order to repair mechanical aspects of the system. The turning off of power might trigger a power failure alarm and an intrusion alarm. The service mode would prevent such alarms from being further processed.

Figure 5:
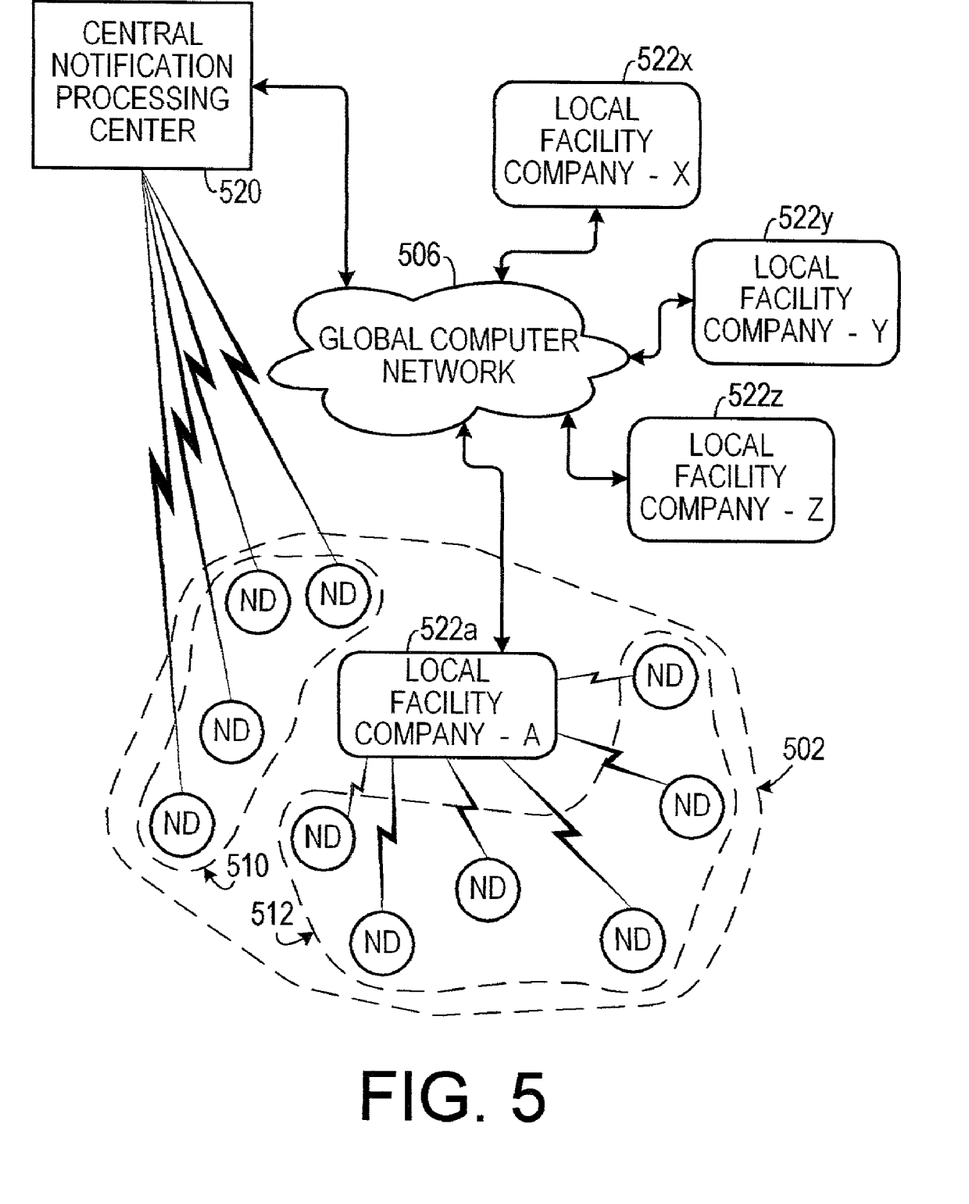
FIG. 5 is a schematic diagram of a hybrid system according to one aspect of the invention.

As shown in FIG. 5, some users may wish to phase in use of an event notification system according to the invention with an existing user-specific event notification system. Typically, the present system includes a plurality of local facilities 522a and 522x–z, each of which could belong to a different entity, that communicate with the central notification processing center 520 via the global computer network 506. One of the local facilities 522a would cover a local area of operation 502, and would communicate with a plurality of new event notification devices 510 according to the invention and a private network of prior art notification devices 512 (e.g., auto dial or dedicated radio devices). In such a case, the central notification processing center 520 could translate the data received from the new devices 510 into the format presented by the prior art devices 512 (which are part of a proprietary network, including a local network) and emulate the screen presentations generated by the prior art systems and present them to the local facility 522a. The local facility 522a could also transmit the data from the prior art notification devices 512 to the central notification processing center 520 via the global computer network 506. The central notification processing center 520 could then integrate the data so received with the data received from the new notification devices 510 and present a unified display to the local facility 522a in the format of the local facility's choice.

Figure 6:
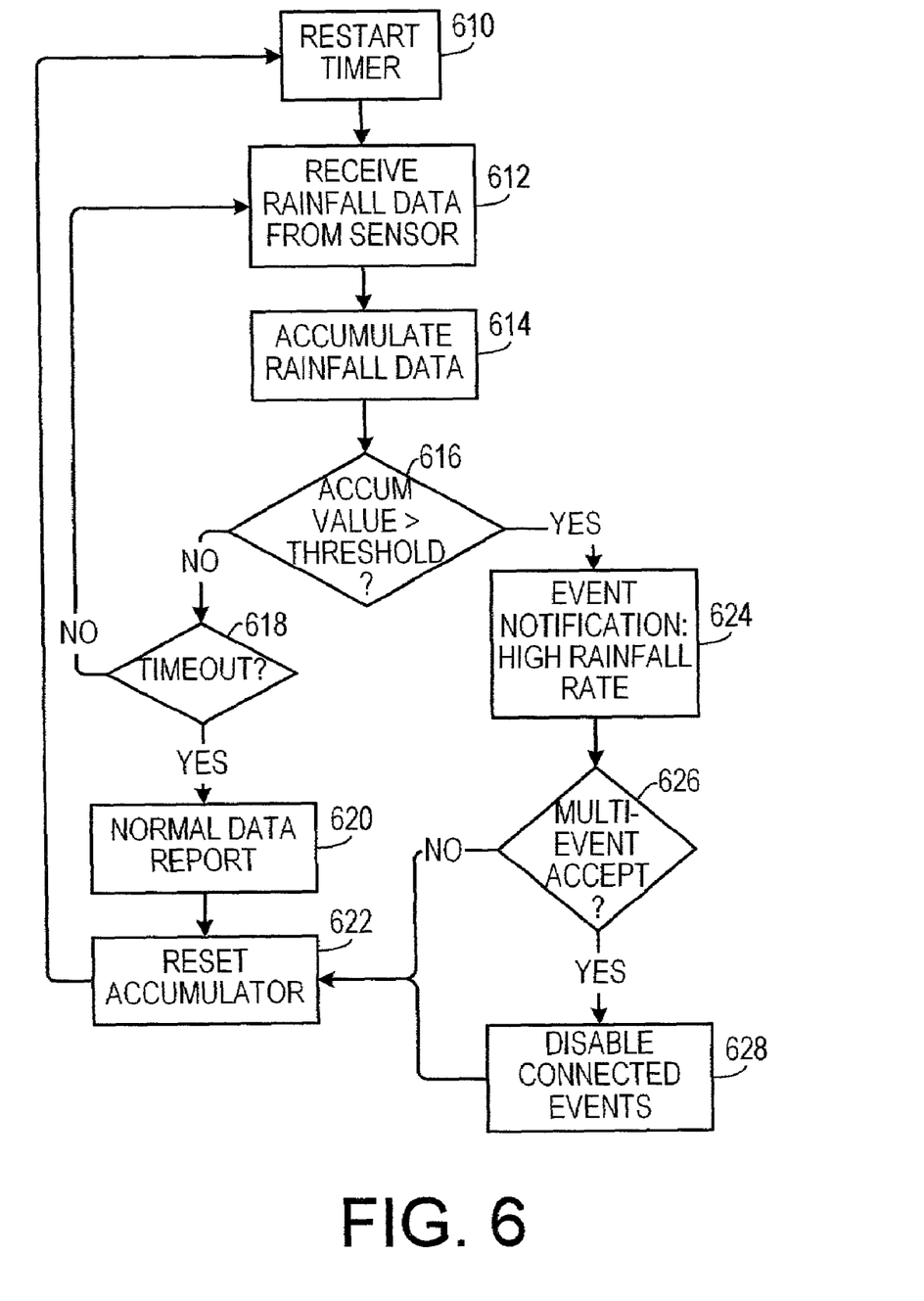
FIG. 6 is a flowchart illustrating one embodiment of a method for reporting rainfall according to the invention.

Rainfall data may be processed, as shown in FIG. 6, by the central notification processing center. In one illustrative embodiment, a computer at the central notification processing center starts a timer 610 that counts down a preselected amount of time (e.g., one hour). During that time, the central notification processing center periodically receives rainfall data 612 from at least one rainfall sensor. The amount of rainfall is added to an accumulator, or other memory location, and a test 616 is performed to determine if the value stored in the accumulator is greater than a predetermined threshold value (e.g., one-tenth of one inch). If the accumulator value has not exceeded the threshold value, then a test 618 is performed to determine if the timer has timed out. If not, then the next packet of rainfall data is received 612. Otherwise, a normal data report is transmitted 620 to the local facility, the accumulator is reset 622, the timer is reset 610 and the process repeats itself.

If test 616 indicates that the accumulated rainfall for a given period exceeds the threshold, then an urgent event notification is sent 624 both to a preselected individual or individuals responsible for such an event and to the local facility. The event notification and response procedure used could be according to the procedure outlined above, with respect to FIGS. 3A–C. Given that heavy rain could fall over an extensive geographic area, triggering several events relating to several corresponding rainfall sensors, the system could allow a technician to accept responsibility for several related heavy rainfall events. If the system determines 626 that the technician does not accept responsibility for multiple events, then the accumulator is reset 622 and the process is repeated. If the technician accepts responsibility for multiple events, then the system disables 628 reporting of subsequent related rainfall events during a preselected period of time, the accumulator is then reset 622 and control passes to the restarting of the timing circuit 610.

In one application of the invention, the system can be used to generate preventative maintenance logs, watchman visit logs and other audit trails. The individual's personal identification data is read by the personal identification apparatus at the preselected location. This information is transmitted to the central processing center via a wireless communication channel, along with a timestamp and a location identifier. The information received at the central processing center is stored and a visit report is generated from the stored information.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of transmitting an event notification, comprising the steps of:
    a. transmitting from a central computer at a central notification processing center to a first individual, via a not-automatically receipt confirmed transmission medium, a first data packet that includes a first event code, the first event code corresponding to a first event;
    b. upon receiving, by the central computer, a response communication from the first individual, transmitting a request from the central computer to the first individual requesting that the first individual respond with the first event code;
    c. if the first individual responds by transmitting to the central computer the first event code, then identifying the first event from the first event code;
    d. transmitting from the central computer instructions relating to the event to the first individual;
    e. transmitting from the central computer to a second individual, via a not-automatically receipt confirmed transmission medium, a second data packet that includes a second event code, the second event code corresponding to the first event;
    f. upon the central computer receiving a response communication from the second individual, transmitting a request from the central computer to the second individual requesting that the second individual respond with the second event code;
    g. identifying with the central computer the first event and the second individual from the second event code; and
    h. if the step of transmitting instructions relating to the first event to the first individual has been completed prior to the central computer receiving a response communication from the second individual, then transmitting from the central computer to the second individual an indication that the second individual is not required to respond to the first event.

2. The method of claim 1, further comprising the step of using the central computer to identifying the first individual from the first event code.

3. The method of claim 1, further comprising the step of using the central computer to identifying the first individual from a caller identification data packet received from a telephone.

4. The method of claim 1, wherein the first event comprises an alarm at a selected location.

5. The method of claim 1, further comprising the step of using the central computer to maintain a record of the telephone call received from the first individual.

6. The method of claim 1, wherein the instructions include directions to a location of the first event.

7. The method of claim 1, further comprising the step of selecting, using the central computer, the first individual from a plurality of individuals based upon a preselected set of criteria.

8. The method of claim 7, wherein the preselected set of criteria include at least one of the following:
    a. who of the plurality of individuals is currently on duty;
    b. who of the plurality of individuals is closest to a location of the first event;
    c. who of the plurality of individuals is currently not assigned to another event; and
    d. who of the plurality of individuals is most capable of responding to the first event.

9. The method of claim 1, further comprising the step of transmitting from the central computer to a local computer at a local computer at a local facility an indication that the first event has occurred.

10. The method of claim 1, further comprising the step of displaying information relating to the first event on a site accessible to a user via a global computer network.

11. The method of claim 10, wherein the information includes a graphical display of a location of the first event.

12. The method of claim 10, wherein the information includes a graphical display of a nature of the first event.

13. The method of claim 10, wherein the information includes a graphical display of a current location of the first individual.

14. The method of claim 1, further comprising the step of employing the central computer to verify that the first individual has responded to the first event by reading a personal identification of the first individual.

15. The method of claim 14, wherein the verifying step comprises the step of reading a personal identification apparatus at a location of the first event and transmitting data resulting from the reading of the personal identification apparatus to the central computer.

16. The method of claim 14, wherein the verifying step comprises the step of reading biometric data at a location of the first event and transmitting data resulting from the reading of biometric data to the central computer.

17. The method of claim 14, further comprising the step of activating a service mode upon completion of the verifying step, wherein the first event occurs at a first location and wherein the service mode causes a preselected set of subsequent events occurring at the first location to be ignored by the central computer.

18. The method of claim 14, further comprising the step of activating a service mode upon completion of the verifying step, wherein the first event occurs at a first location and wherein the service mode causes a preselected set of pending events occurring at the first location to be ignored by the central computer.

19. The method of claim 1, wherein the transmitting step comprises the step of instructing the first individual to follow a procedure to indicate acceptance of responsibility for the first event to the central computer.

20. The method of claim 19, wherein the procedure comprises depressing a preselected button on a telephone handset.

21. The method of claim 1, wherein the transmitting step comprises the step of transmitting from the central computer a description of the first event to the first individual.

22. The method of claim 1, wherein the transmitting step comprises the step of transmitting from the central computer at least one instruction to the first individual as to how the first individual is to respond to the first event.

23. The method of claim 1, wherein a plurality of events occurs at a location and wherein if the first individual responds to the first event then the central computer recognizes that the first individual accepts responsibility for each of the events of the plurality of events.

24. The method of claim 1, wherein a plurality of events occurs at a location, further comprising the step of allowing the first individual to selectively accept responsibility for each of the events of the plurality of events.

25. The method of claim 1, wherein the first event occurs at a first location and wherein at least one second event is triggered by the first event, further comprising the step of receiving acceptance by the central computer for the second event when the first individual indicates acceptance for the first event.

* * * * *